United States Patent [19]

Michelfelder et al.

[11] Patent Number: 4,469,033

[45] Date of Patent: * Sep. 4, 1984

[54] METHOD OF MINIMIZING THE EMISSION OF CONTAMINANTS FROM COMBUSTION PLANTS

[75] Inventors: Sigfrid Michelfelder; Helmut Voos, both of Gummersbach, Fed. Rep. of Germany

[73] Assignee: L. & C. Steinmüller GmbH, Gummersbach, Fed. Rep. of Germany

[*] Notice: The portion of the term of this patent subsequent to Jul. 24, 2001 has been disclaimed.

[21] Appl. No.: 349,579

[22] Filed: Feb. 17, 1982

[30] Foreign Application Priority Data

Feb. 21, 1981 [DE] Fed. Rep. of Germany ....... 3106526

[51] Int. Cl.$^3$ ............................................. F23J 1/00
[52] U.S. Cl. ................................... 110/344; 110/215; 110/216; 110/345
[58] Field of Search ............... 110/342, 343, 344, 345, 110/215, 216; 431/4

[56] References Cited

U.S. PATENT DOCUMENTS

| 2,800,172 | 7/1957 | Romer et al. ........................ 431/4 |
| 3,287,902 | 11/1966 | Khristianovich et al. ..... 110/342 X |
| 3,837,820 | 9/1974 | Kukin ............................... 110/343 X |
| 4,331,638 | 5/1982 | Michelfelder ........................... 431/4 |

Primary Examiner—Edward G. Favors
Attorney, Agent, or Firm—Becker & Becker, Inc.

[57] ABSTRACT

A method of treating reaction products which result from the combustion of fuels containing contaminants such as sulfur, chlorine, and fluorine compounds, and ash. Additives are reacted in the combustion chamber with gaseous contaminants of the reaction products of the combustion. Subsequently, the remaining reactive additives, the reactive ash constituents, and possibly supplementary additives are reacted externally of the combustion chamber with the still uncombined gaseous contaminants of the reaction products.

11 Claims, 6 Drawing Figures

METHOD OF MINIMIZING THE EMISSION OF CONTAMINANTS FROM COMBUSTION PLANTS

The present invention relates to a method of treating reaction products with additives, with the goal of reducing the emission of contaminants which result from the combustion of fuels which contain contaminants such as sulfur, chlorine, and fluorine compounds, and ash.

Gaseous contaminants result during the combustion of fuels containing, for example sulfur, chlorine, and fluorine compounds; the emission of these gaseous contaminants must be restricted to permissible values.

It is known to limit emissions with precipitation or separation methods, according to which the reaction products are treated with additives contained in a suspension or solution. The plants for carrying out this treatment are very expensive to set up and operate. In this connection, it is especially disadvantageous that the treated reaction products are steam saturated after separation of the contaminants, and must again be brought to a higher temperature before being introduced into the atmosphere in order to assure a necessary diffusion of these gases in the atmosphere, and to extensively prevent the condensation of acid fogs.

It is furthermore known that these disadvantages can be partially avoided thereby that the suspended additives are admixed at such a concentration that a reduction of the cooling down of the reaction products is achieved by evaporation of water with simultaneous separation of the contaminants. In this connection, however, it is disadvantageous that the consumption of additives increases, and again it may be necessary to heat up the reaction products before introducing them into the atmosphere.

It is also known that, in order to avoid the disadvantages of the aforementioned procedures which occur after the combustion, additives can be added directly to the fuel, or in a different manner to the combustion chamber. It is, however, disadvantageous with such a procedure, that the reactivity of the additives is only partially utilized.

The previously described procedural techniques have the disadvantage that the required separation of contaminants is only attainable with high set up and/or operating costs.

It is therefore an object of the present invention to treat the reaction products, resulting from combustion of fuel containing contaminants such as sulfur, chlorine, and fluorine compounds, and ash, with additives in such a way that an optimum utilization of the reactivity of these additives and ash is attained while simultaneously minimizing the emission of these contaminants and avoiding, in particular, a reheating of the reaction products.

This object, and other objects and advantages of the present invention, will appear more clearly from the following specification in connection with the accompanying drawings which provide schematic illustrations of exemplary embodiments according to the present invention as follows.

Figure 5:
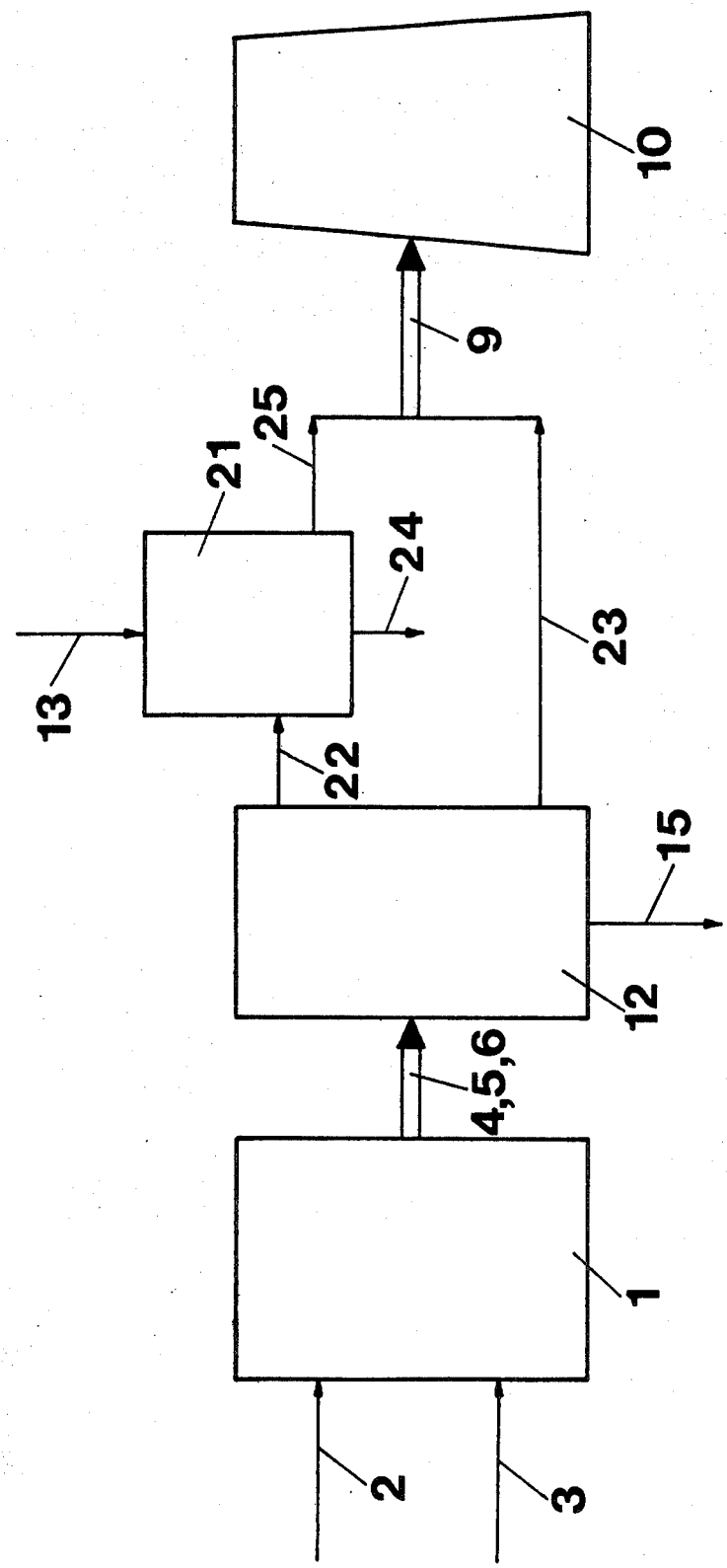
Figure 6:
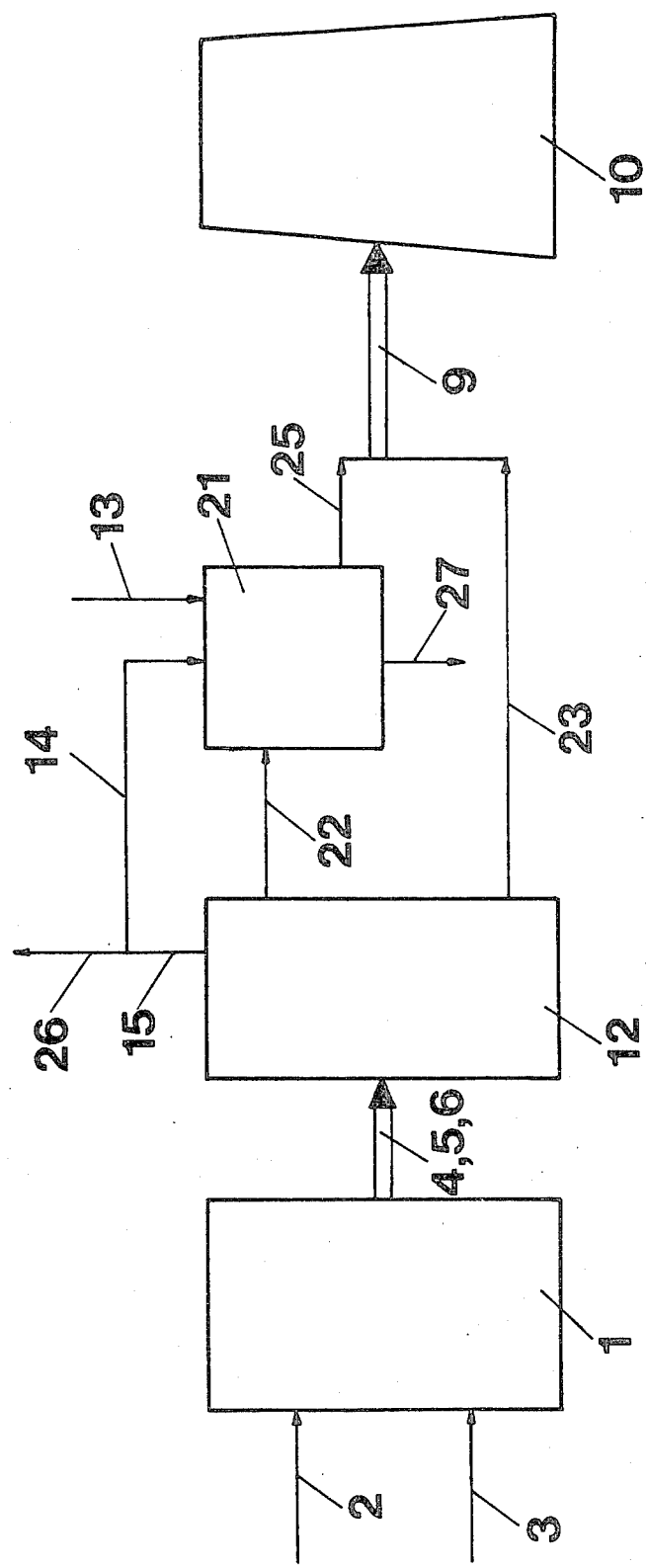

FIG. 5 illustrates a procedural variation according to which a reactor is connected after or downstream of the filtering separator, this reactor only being acted upon by a partial flow of the reaction products, with only fresh additive being added in the reactor; and FIG. 6 illustrates an alternative to the method of FIG. 5, according to which, aside from fresh additives, also reactive additives from the filtering separator are supplied to the reactor.

The method of the present invention is characterized primarily by a combination of the following steps:

(a) Additives are reacted in the combustion chamber with gaseous contaminants of the reaction products of the combustion; and (b) subsequently, the remaining reactive additives, the reactive ash constituents, and possibly supplementary additives are reacted externally of the combustion chamber with the still uncombined gaseous contaminants of the reaction products from the combustion.

By treating the reaction products not only within but also externally of the combustion chamber, whereby during the treatment externally of the combustion chamber the remaining reactive additives from the first method step are again brought into contact in the second method step with the reaction products by means of specific influencing measures, there is advantageously accomplished that with a specific prescribed additive quantity an optimal minimizing of the emission of the contaminants is achieved.

The treatment of the reaction products externally of the combustion chamber can, according to a preferred embodiment of the method of the present invention, take place in a filtering separator, preferably a fabric filter.

If the solids, namely additive and ash, contained in the reaction products are separated from the gaseous reaction products externally of the combustion chamber in a filtering separator, preferably a fabric or cloth filter, then the retention time of the still reactive additives, which are contained in the solids, is increased by several magnitudes in the contaminants containing flow of gaseous reaction products; in addition, the reaction products, before discharge into the flue or the atmosphere, are once again intimately mixed with the remaining reactive additives and reactive ash constituents. Both procedures increase the efficiency or utilization factor of the added additives and, while keeping the same emission values, permit a reduction of the additive consumption, thus optimizing the method.

If the additive quantity added to the combustion chamber must be limited for reasons of procedural technique, which can be caused by secondary effects, such as the danger of slagging and fouling the walls of the combustion chamber, or the danger of dead-burning of the additive, it may be necessary for optimum utilization of the reactivity of the additives to add a portion of the additives to a reactor connected ahead of the filtering separator externally of the combustion chamber; in this reactor, the reactions of the second method step are initiated, which reactions then continue in the filtering separator until the desired emission values are obtained.

Utilization of a spray absorber is advantageous under these circumstances, since with a wet purification the reaction products must again be raised to a high temperature, with high expenditure of energy ahead of the filtering separator, and in the spray absorber the reaction speed between the additives and the gaseous contaminants of the reaction products is greater than when adding the additive in dry form; consequently, the additive consumption is reduced.

The additives added in the preconnected reactor can be prepared in different ways. For instance, the added additives can be still reactive additives and reactive ash constituents separated or precipitated from the filtering separator, to which possibly supplementary (fresh) additives can be added. The total additive consumption is minimized due to the re-use of the still reactive additives from the filtering separator.

To achieve optimum procedure, it can also be advantageous for cost reasons to construct or design the reactor which is connected ahead of the filtering separator for only a partial flow of the reaction products; however, both partial flows are again combined ahead of the filtering separator for continuing the reactions until the desired limit values are obtained.

An advantageous process control can also be to carry on the reaction externally of the combustion chamber in a filtering separator, preferably an electrostatic precipitator, after which a further reactor is connected, in which a partial flow of the reaction products is treated anew, whereby this reaction preferably takes place in a wet separator to which the additives are supplied in the form of a suspension. This partial flow is combined with the remaining flow of the reaction products prior to entry into the flue. The utilization of a wet separator has the advantage that the additives react nearly stoichiometrically, and the solids precipitated in the filtering separator, as well as the solids obtained in the wet separator, can be supplied for different uses.

As was the case for the preceding reactor, with a subsequent reactor the added additives can be reactive additives and reactive ash constituents precipitated from the filtering separator, as well as possibly supplementary additives.

Thus, to optimize the absorbent consumption, it can also be advantageous to remove the solids which contain still reactive additives in a filtering separator, and to react at least a part of the solids in the form of a suspension in a subsequently connected reactor with the reaction products or a partial flow of the reaction products. This is especially advantageous if a separate use of the solids is not practicable.

Referring now to the drawings in detail, the method according to the present invention is basically carried out in such a way that for the treatment, the reaction products, which result from the combustion of fuels containing contaminants such as sulfur, chlorine, and fluorine compounds, and ash, are reacted within and externally of the combustion chamber by the addition of additives.

Figure 1:
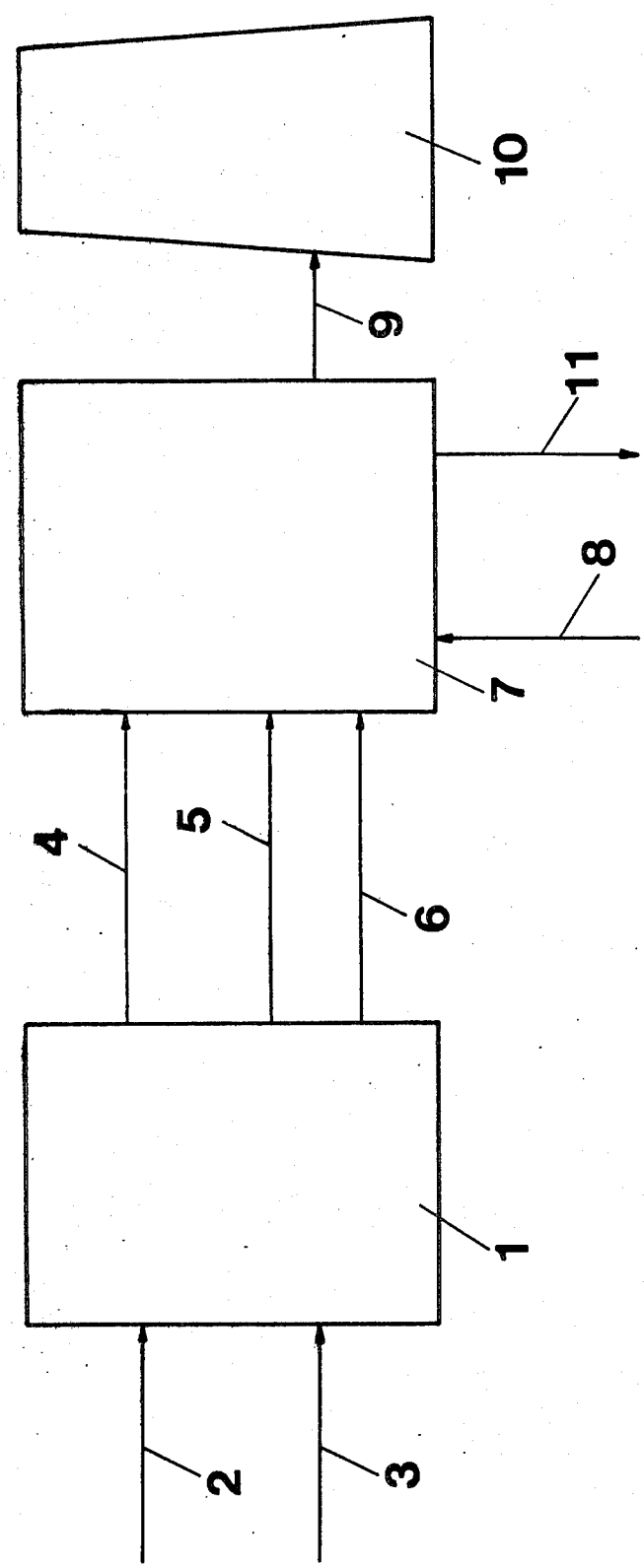
FIG. 1 is a block diagram illustrating the basic principle of the present invention.

As shown diagrammatically in FIG. 1, among other things, fuels 2 containing contaminants, as well as additives 3, are supplied to the combustion chamber 1. The gaseous contaminants of the reaction products of the combustion react in the combustion chamber 1 with a portion of the additives 3. Among other things, reaction products 4 which still contain contaminants, remaining reactive additives 5, as well as reactive ash constituents 6 leave the combustion chamber 1. To further treat the reaction products, which still contain contaminants, these material flows are further reacted in a reactor 7. Supplementary fresh additives 8 can be supplied to this reactor 7. The purified reaction products 9, among other things, discharge from the reactor 7 into the chimney or flue 10; precipitated solids 11 also discharge therefrom.

Figure 2:
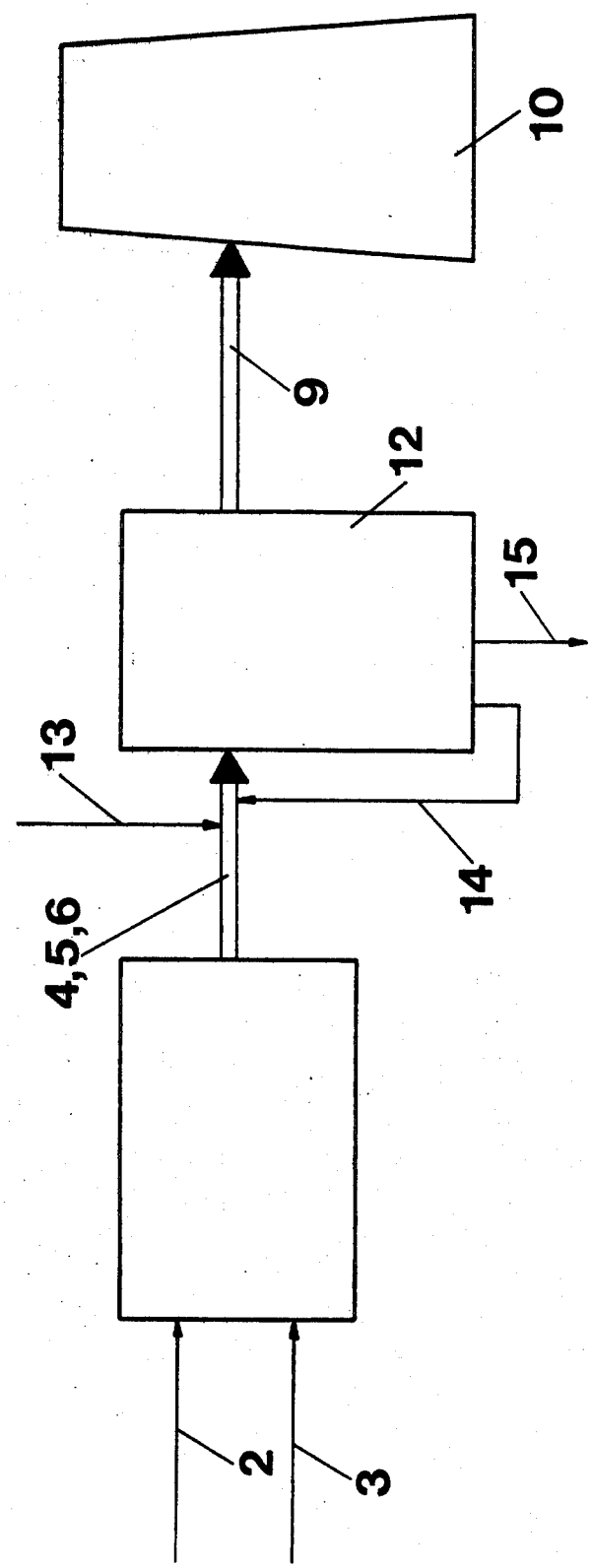
FIG. 2 illustrates an inventive embodiment according to which a filtering separator is employed externally of the combustion chamber for the operating sequence of the reactions.

In the embodiment of FIG. 2, a filtering separator 12 is utilized as a reactor. Supplementary fresh additives can be added via 13 to the material flows 4, 5 and 6 before their entry into the filtering separator 12. Solids 14 which in part are still reactive and which are precipitated or separated in the filtering separator, can also be added to the material flows 4, 5 and 6. The solid material flow 15 which is to be withdrawn is removed from the process. The treated reaction products 9 are conveyed to the flue 10.

Figure 3:
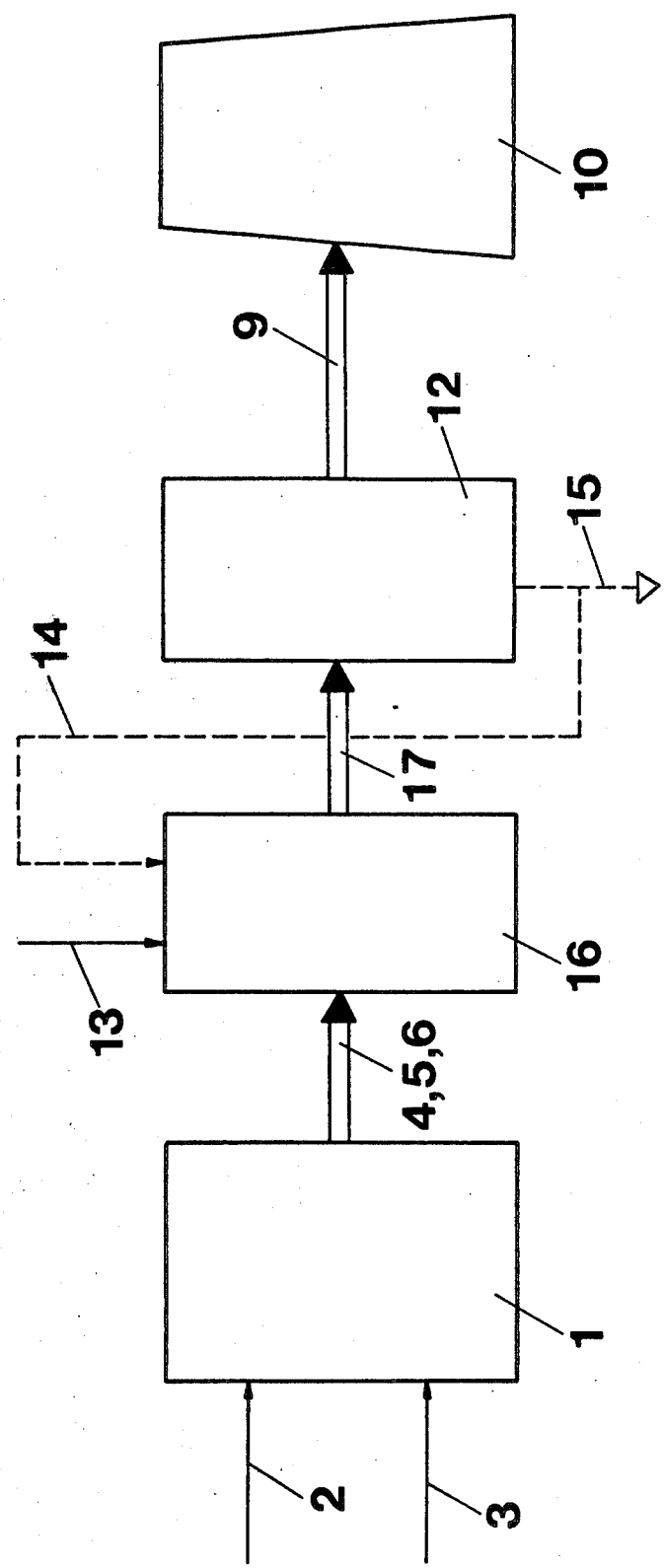
FIG. 3 illustrates a procedural variation of the embodiment of FIG. 2, according to which a reactor is interposed ahead of the filtering separator.

According to the alternative method illustrated in FIG. 3, a reactor 16 is connected ahead of the filtering separator 12. This reactor 16 is preferably constructed as a spray absorber. In contrast to the procedural variation illustrated in FIG. 2, the additives 13, 14 are supplied to the reactor 16. This has the advantage that the reaction of these additives with the contaminants of the reaction products is intensified in the reactor 16, with the result that the material flows 13 and 14 can be minimized. The material flow 17 is added to the filtering separator 12 as illustrated. The remaining steps of this method correspond to that of FIG. 2.

Figure 4:
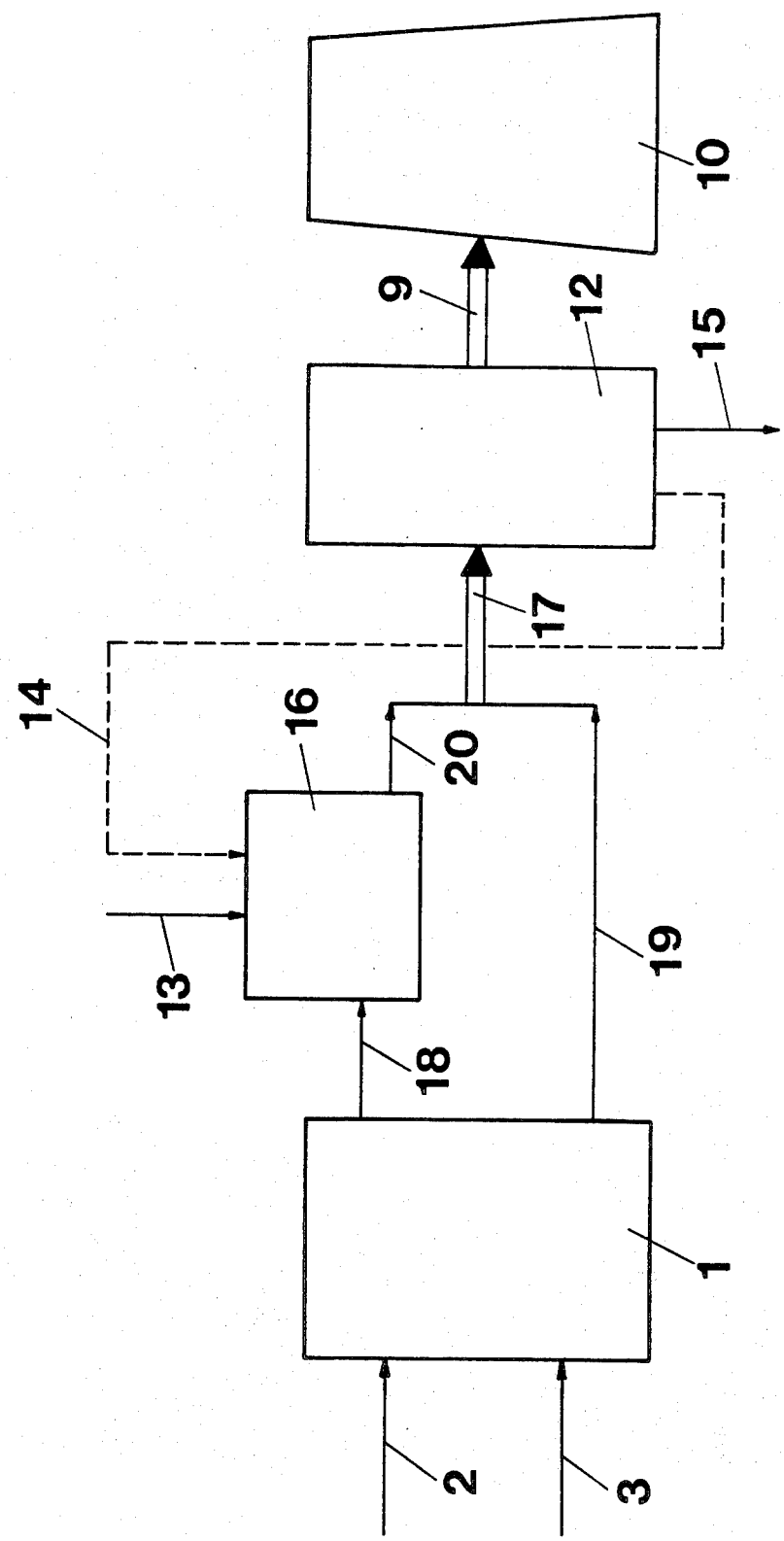
FIG. 4 illustrates another procedural variation of the embodiment of FIG. 3, according to which only a partial flow of the reaction products coming from the combustion chamber can be supplied to the reactor, and, to which reactor, in addition to supplementary additives, reactive additives from the filtering separator can be added.

According to the procedural variation of FIG. 4, only a partial flow 18 of the product flows 4, 5, and 6 is supplied to the reactor 16. The material flow 20 discharging from the reactor 16, and the partial flow 19 from the combustion chamber, are supplied as the product flow 17 to the filtering separator 12.

The procedural variation according to FIG. 5 shows that a reactor 21 can also be connected after or downstream of the filtering separator 12. The material flows 4, 5 and 6 are supplied to the filtering separator 12, where the solids 15 are precipitated. A partial flow 22 of the contaminated reaction products is supplied for further treatment to the reactor 21, where it is reacted with the additive flow 13. A flow of reacted additives 24 from the reactor 21 is removed from circulation; the purified partial flow 25 of the reaction products is combined with the remaining partial flow 23 from the filtering separator 12, and is conveyed as material flow 9 to the flue 10.

As a modification of the procedural variation according to FIG. 5, in the method illustrated in FIG. 6, the additive flow introduced into the reactor 21 is composed of a partial flow 14 of the solids 15 precipitated in the filtering separator 12, as well as, if necessary, fresh additives 13. A partial flow 26 of the solids separated in the filtering separator is also removed from circulation as is the flow 27 of the reacted additives. The material flow 25 of the subsequently purified reaction products is combined with the material flow 23 from the filtering separator, and is supplied to the flue 10.

The present invention is, of course, in no way restricted to the specific disclosure of the specification and drawings, but also encompasses any modifications within the scope of the appended claims.

What we claim is:

1. A method of treating reaction products which result from the combustion of fuel which contains contaminants, said method comprising the steps of:

subjecting said fuel to combustion in a combustion chamber to form reaction products which contain gaseous contaminants;

then adding additives to said combustion chamber for reaction therein with the gaseous contaminants of the reaction products to form remaining reactive additives, reactive ash constituents, and further reaction products which contain still uncombined gaseous contaminants;

subsequently reacting said remaining reactive additives, said reactive ash constituents, and said still uncombined gaseous contaminants of said further reaction products externally of the combustion chamber via external reactions at least partially initiating said external reactions to produce reaction products; conveying at least a partial flow of said reaction products to a reactor; continuing said external reactions to form reaction products; adding supplementary additive; combining said reaction products with the remaining flow of reaction products; and conveying said combined flow of reaction products to a flue.

2. A method according to claim 1, which includes the step of adding supplementary additive to the external reactions externally of the combustion chamber.

3. A method according to claim 2, which includes the step of carrying out the external reactions in a filtering separator.

4. A method according to claim 3, in which said filtering separator is a fabric filter.

5. A method according to claim 2, which includes the steps of at least partially initiating said external reactions in a reactor, continuing said external reactions in a subsequent filtering separator, and adding said supplementary additive to said reactor.

6. A method according to claim 5, in which said reactor is a spray absorber.

7. A method according to claim 5, in which said supplementary additive at least in part is still reactive additive and reactive ash constituents separated-off in said filtering separator.

8. A method of treating reaction products which result from the combustion of fuel, which contains contaminants, said method comprising the steps of:

subjecting said fuel to combustion in a combustion chamber to form reaction products which contain gaseous contaminants;

then adding additives to said combustion chamber for reaction therein with the gaseous contaminants of the reaction products to form remaining reactive additives, reactive ash constituents, and further reaction products which contain still uncombined gaseous contaminants;

subsequently reacting said remaining reactive additives, said reactive ash constituents, and said still uncombined gaseous contaminants of said further reaction products externally of the combustion chamber via external reactions;

adding supplementary additive to external reactions externally of the combustion chamber;

at least partially initiating said external reactions in a reactor, continuing said external reactions in a subsequent filtering separator, and adding said supplementary additive to said reactor, said supplementary additive at least in part being still reactive additive and reactive ash contintuents separated-off in said filtering separator;

conveying a partial flow, from said combustion chamber, of said remaining reactive additives, said reactive ash constituents, and said still uncombined gaseous contaminents of said further reaction products to said reactor; and combining this partial flow with the remaining flow of such products from said combustion chamber prior to entry into said filtering separator.

9. A method of treating reaction products which result from the combustion of fuel which contains contaminants, said method comprising the steps of:

subjecting said fuel to combustion in a combustion chamber to form reaction products which contain gaseous contaminants;

then adding additives to said combustion chamber for reaction therein with the gaseous contaminants of the reaction products to form remaining reactive additives, reactive ash constituents, and further reaction products which contain still uncombined gaseous contaminants;

subsequently reacting said remaining reactive additives, said reactive ash constituents, and said still uncombined gaseous contaminants of said further reaction products externally of the combustion chamber via external reactions;

initiating said external reactions in a filtering separator to produce reaction products; conveying at least a partial flow of said reaction products from said filtering separator to a reactor; continuing said external reactions in said reactor to form reaction products; adding supplementary additive in the form of a suspension to said reactor; combining said reaction products from said reactor with the remaining flow of reaction products from said filtering separator; and conveying said combined flow of reaction products to a flue.

10. A method according to claim 9, in which said filtering separator is an electrostatic precipitator, and said reactor is a wet separator.

11. A method according to claim 9, in which said supplementary additive at least in part is still reactive additive and reactive ash constituents separated-off in said filtering separator.

* * * * *